INVENTORS
ROBERT C. GESTELAND
BRADFORD HOWLAND
WALTER H. PITTS
BY
Rines and Rines
ATTORNEYS Oct. 19, 1965    R. C. GESTELAND ETAL    3,213,440
PROCESS OF AND APPARATUS FOR PRODUCING THE LUMINESCENT
EMISSION OF RADIANT ENERGY
Filed May 16, 1961    7 Sheets-Sheet 3
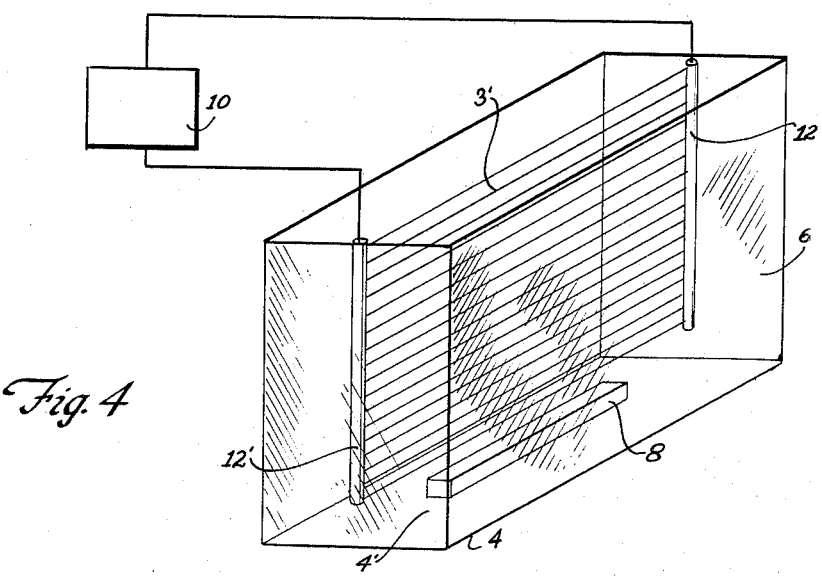
Fig. 4
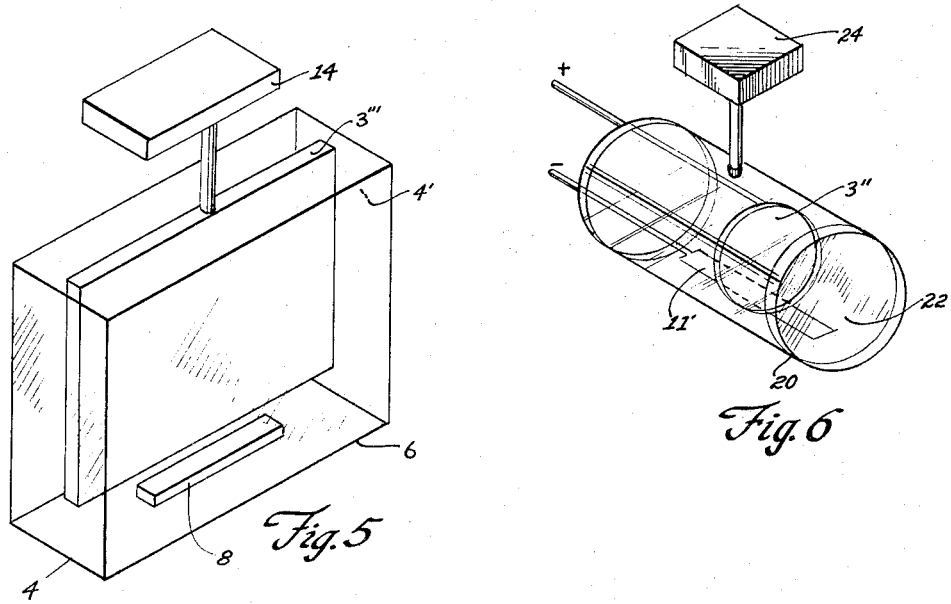
Fig. 5
Fig. 6
INVENTORS
ROBERT C. GESTELAND
BY BRADFORD HOWLAND
WALTER H. PITTS
Rines and Rines
ATTORNEYS Oct. 19, 1965    R. C. GESTELAND ETAL    3,213,440
PROCESS OF AND APPARATUS FOR PRODUCING THE LUMINESCENT
EMISSION OF RADIANT ENERGY
Filed May 16, 1961    7 Sheets-Sheet 5
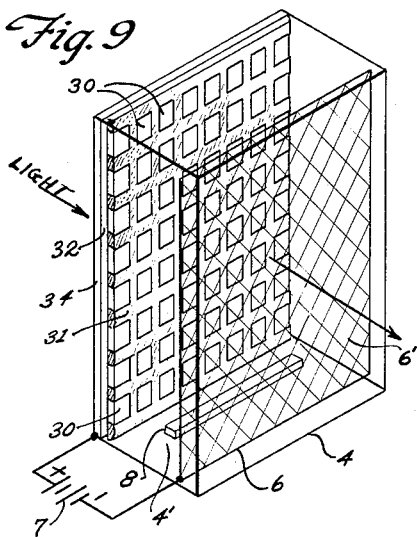
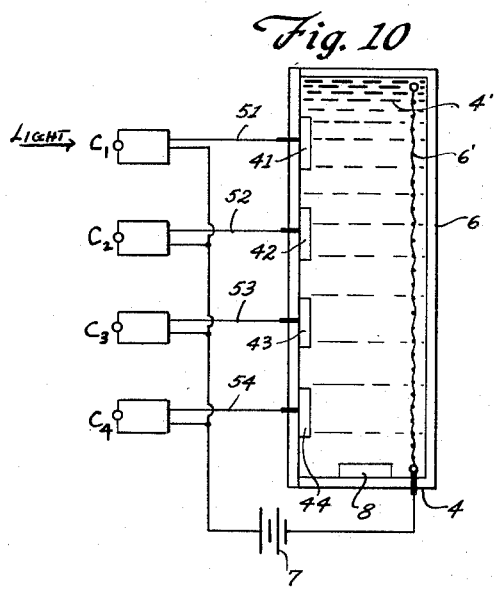
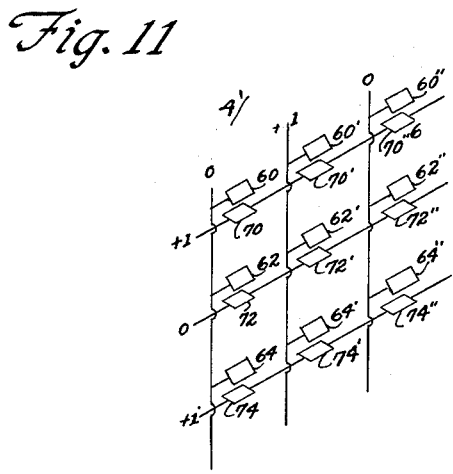
INVENTORS
ROBERT C. GESTELAND
BRADFORD HOWLAND
WALTER H. PITTS
BY
Rines and Rines
ATTORNEYS Oct. 19, 1965   R. C. GESTELAND ETAL   3,213,440
PROCESS OF AND APPARATUS FOR PRODUCING THE LUMINESCENT
EMISSION OF RADIANT ENERGY
Filed May 16, 1961   7 Sheets-Sheet 6
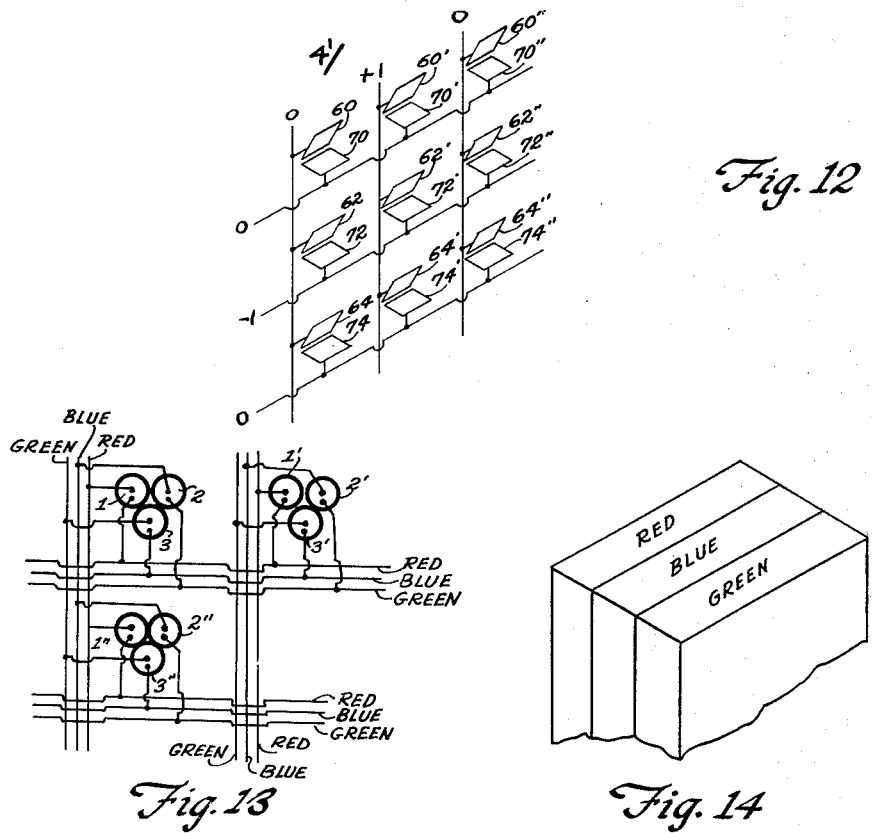
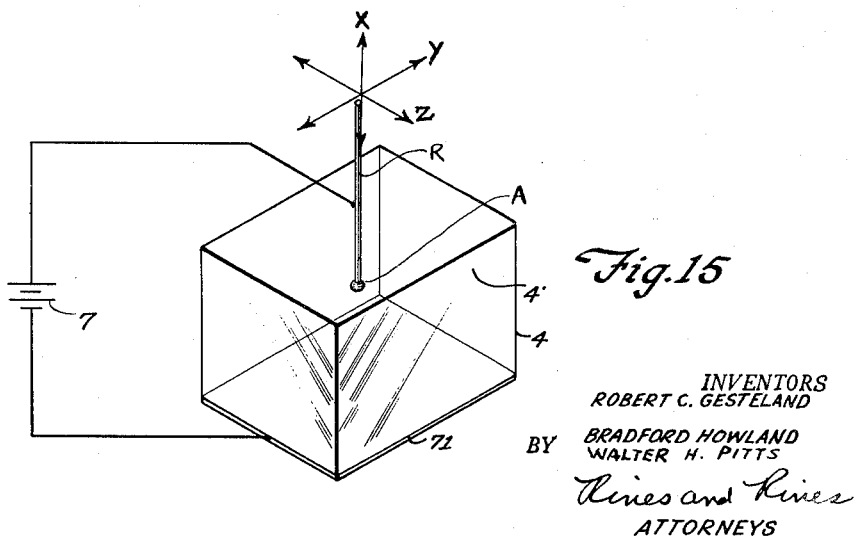
INVENTORS
ROBERT C. GESTELAND
BY BRADFORD HOWLAND
WALTER H. PITTS
Rines and Rines
ATTORNEYS Oct. 19, 1965                    R. C. GESTELAND ETAL                    3,213,440
                PROCESS OF AND APPARATUS FOR PRODUCING THE LUMINESCENT
                                EMISSION OF RADIANT ENERGY
Filed May 16, 1961                                                   7 Sheets-Sheet 7

INVENTOR.
ROBERT C. GESTELAND
BRADFORD HOWLAND
BY  WALTER H. PITTS

Rines and Rines
ATTORNEYS

# United States Patent Office 3,213,440
Patented Oct. 19, 1965

3,213,440
PROCESS OF AND APPARATUS FOR PRODUCING THE LUMINESCENT EMISSION OF RADIANT ENERGY
Robert C. Gesteland, 75 Burbank St., Boston, Mass., and Bradford Howland, 185 Hancock St., and Walter H. Pitts, 32 Mt. Pleasant St., both of Cambridge, Mass.
Filed May 16, 1961, Ser. No. 110,515
29 Claims. (Cl. 340—324)

The present invention relates to processes of and apparatus for producing luminescent emission of radiant energy, and, particularly, to the production and control of chemiluminescent phenomena.

Two groups of organic compounds have long been known to display a bright chemiluminescence in alkaline aqueous solution, when mixed with hydrogen peroxide and a suitable catalyst (such as NaOCl, $Fe^{++}$, $OsO_4$, etc.) One group consists of "luminol" (5-amino-1,4-dihydroxy phthalazine) and its derivatives; another of "lucigenin" (N,N'-dimethyl - 5,5' - bisacridinium nitrate) and related compounds. More recently, a group of polycyclic vat dyestuffs derived from benzanthrone, such as violanthrone, have been shown to have the same property, with the important difference, however, that the light must be evoked in a liquid such as pyridine, capable of dissolving both the dystuffs and $H_2O_2$, or at the boundary between an aqueous phase and an organic solvent. With luminol, the light produced is a bright blue; with lucigenin, green; with the vat dyestuffs, yellow, orange, or red.

The luminescent effect is a bulk-glowing effect throughout the solution. With different catalysts, diifferent intensities of light may be produced, but the duration appears to be roughly inversely proportional to the brightness of the radiated light energy.

When two appropriate electrodes, such as platinum, are immersed in a solution of luminol, preferably with $H_2O_2$, without a catalyst, and a voltage is applied between the electrodes, a bright blue glow appears, sharply confined at the anodic electrode, and nowhere else in the solution. The same is true of lucigenin, except that, in this case, the generated green light appears at either the anode or the cathode. The possibility of confining the light to the surface of an electrode, and controlling it by controlling the voltage applied, at once renders the phenomena interesting for technical purposes, particularly since its properties are quite different from any other method of evoking light by an electric current. Unfortunately, though, the related light energy is of relatively short duration and decreasing intensity, rendering such electro-chemiluminescent phenomena impractical for commercial or other light-producing applications.

In accordance with the present invention, however, it has been discovered that such electro-chemiluminescent effects may be caused not only to be sharply confined to predetermined areas or regions at will, but also that the radiated light energy may be rendered continual, and not intermittent, and brilliant. In summary, this result is attained by providing appropriate circulation of the solution at the boundary of the electrode at which the luminescence is produced. Underlying the present invention are also several other discoveries that have enabled the practical utilization of these phenomena in light-energy systems. It has been found that if the D.C. potential between two electrodes is properly adjusted, the light emitted will follow a superimposed A.C. signal up to at least 30 kc. It has also been discovered that, with certain proportions of the reactants and a fairly high potential across the cell, the glow quickly diminishes to an almost imperceptible level and remains there; but when the electrode is moved, or the fluid is circulated past the electrode in the solution, the glow reappears with great brilliance and remains until the internal motion of the solution has subsided. This effect is much less marked at lower potential differences, as one would expect if it proceeded from an almost complete depletion of one of the reactants in the boundary layer surrounding the anode. The response to fluid motion can be varied substantially by varying the voltage. It should be mentioned that these effects are likewise present with other passive electrodes; for example, stainless steel, nickel and graphite. But the quantitative behavior is naturally different with different electrodes. Strangely enough, a platinized platinum electrode appears to emit no light at any voltage, even with a solution saturated with oxygen. This is thus an ideal cathode in those cases where only anodic glow is desired.

An object of the present invention, accordingly, is to provide a new and improved process of and apparatus for providing visible or other indications of chemiluminescence in desired preselected regions, to the exclusion of other regions.

A further object is to provide a new and improved luminescence system.

Another object is to provide novel light sources and radiant-energy indicators and generators.

Still a further additional object is to provide a novel electro-chemiluminescent system.

Other and further objects will be explained hereinafter and will be more particularly defined in connection with the appended claims.

The invention will now be described in connection with the accompanying drawings, FIG. 1 of which is a perspective view of apparatus constructed in accordance with the invention, for using electro-chemiluminescence to observe and measure fluid flow phenomena optically, including velocity, heat transfer and momentum transfer, especially in the neighborhood of solid bodies;

FIGS. 3 to 5 are all similar views of modified structures adapted for use as visible light or invisible light communications or measuring instruments having particular advantages of low voltage, reasonable luminous efficiency, fast pulse response, easy dispersion of heat produced, even luminous flux over any size area, and a wide range of spectral emission characteristics;

FIG. 6 is a perspective view of an embodiment of the invention as a low voltage, low power pilot lamp having fast pulse response, sharp turn-on threshold possibilities, wide selection of emitted color, variable intensity of light without any shift of the spectrum energy emitted;

FIGS. 9 and 10 show light amplifiers and/or image converters employing the techniques of the present invention;

FIGS. 11 and 12 are views of electro-chemiluminescent matrix displays embodying the invention;

FIGS. 13 and 14 are fragmentary views of assemblies of electroluminescent cells constructed in accordance with the previously mentioned embodiments for multi-color use;

FIG. 15 is a perspective view of a further modification constructed for the display of trajectories by "writing" with an electrode "pen" in a gel or liquid tank;

Figure 1:
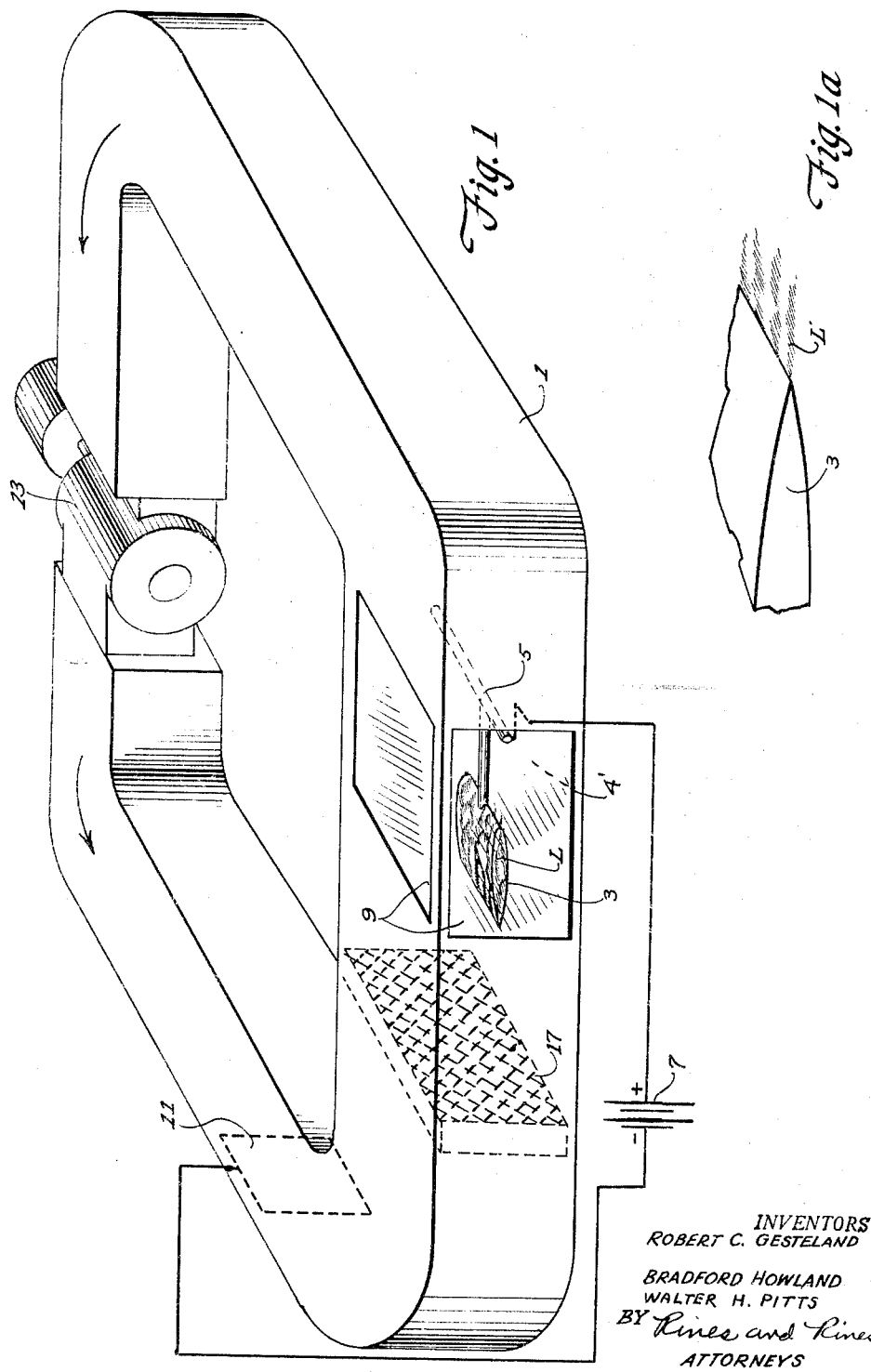
FIG. 1A is a similar fragmentary view of a portion of the system of FIG. 1 extended to observe fluid wakes.

Turning to FIG. 1, an apparatus is shown for employing electro-chemiluminescence phenomena for the purpose of observing and measuring fluid flow phenomena optically, including velocity, heat transfer and momentum transfer, especially in the neighborhood of solid bodies and the like. A conduit 1 is shown in the form of a substantially closed tubular loop of substantially rectangular cross-section, containing luminol or other suitable chemiluminescent solution 4', as before discussed. Disposed within the fluid medium 4' is a hydrofoil or other body 3 about which it is desired to inspect fluid flow characteristics. Since, in the field of hydrodynamic and aerodynamic modeling, where quantities such as the distribution of heat flux across the surface of an object placed in a fluid which is moving in a complicated way are to be measured, heat transfer obeys laws that are mathematically similar to those governing diffusion, the intensity of the light emitted by a point of a model, used as an electrode and placed in a similar field of fluid motion, represents the quantity desired and may be observed visually or by taking photographs. A convenient starting solution 4' for observing these effects consists of 30 mg. luminol, 4 ml. 3 percent $H_2O_2$, 100 ml. $H_2O$, 1 ml. 2 N NaOH, and 7.46 gm. KCl.

In the system of FIG. 1, therefore, the hydrofoil 3 may be of conductive material, such as platinum, graphite or the like, supported in the fluid medium by the support 5, and connected as an anode to the positive (+) terminal of an appropriate power source, such as a battery 7. Windows 9 may be provided in top and side walls of the tubular member 1 in the vicinity of the body 3 to permit visual inspection. A cathode electrode 11 is shown disposed in a more remote up-stream portion of the tubular member 1 connected to the negative (−) terminal of the power source 7. As before described, it has been found that with the utilization particularly of hydrogen peroxide or the like within the luminol solution, and the application of appropriate polarizing potential from the battery 7, an oxidation phenomenon takes place in the aqueous solution at the anode that gives rise to the generation or emission of visible light confined to the surface of the anode 3 within the fluid medium. In accordance with the present invention, by causing the fluid 4' to circulate in the vicinity of the hydrofoil electrode 3, as with the aid of the circulator pump 13, the electro-chemiluminescence, represented as L, not only is confined sharply and selectively to the region immediately adjacent to the surface of the body 3, but the emitted light radiation, showing the fluid-flow characteristics, is bright and continual. A turbulence suppressor screen 17 may, if desired, also be employed. It is thus possible, in accordance with the process of the present invention, to observe or photograph through windows 9, by means of the electro-chemiluminescence L produced at the surface of the hydrofoil 3, the actual flow characteristics of the fluid passing the hydrofoil. The light at L runs from darkness to full brightness as the voltage from the source 7 connected between the electrodes 3 and 11 is changed from about one to two volts. This range can be increased by reducing the conductivity of the solution 4'. Below a certain critical value, there is no light; above it, the light first increases rapidly, then more slowly, and finally saturates. The sharpness of the transition from darkness to light can be much increased by suitably changing the composition of the solution. Full brightness requires perhaps two ma. of current per square centimeter of electrode surface. If an alternating current of increasing frequency is applied, the light emitted will follow accordingly.

When a somewhat higher voltage is impressed across the system, and the liquid 4' is set in motion near the electrode 3, some novel effects appear. First of all, the glow L becomes much brighter and more uniform over the surface 3. As the speed increases, a pattern of eddies appears on it, which at higher speeds, becomes irregular. This represents the turbulent boundary layer around the electrode 3. Evidently a short-lived chemical catalyst is generated at the surface, diffuses into the medium, and there produces light while being destroyed. At higher voltages, the part of the boundary layer rendered visible thickens, and finally one can see something of the wake behind the electrode 3.

If the fluid medium 4' employs methanol or the like instead of water, and the methanolic solution is now gradually acidified with glacial acetic acid, further novel effects appear. The glow L from the turbulent boundary layer immediately next to the electrode 3 dims rapidly and disappears; but the fluid wake behind the electrode begins to glow brightly, as at L', FIG. 1A. As more acid is added, an increasingly long section of the trailing fluid becomes luminous. When approximately 20–40 cm. of it are visible, it has the maximum brightness per unit volume. When the solution is made still more acid, the visible part of the trail L' continues to lengthen, up to a total distance of 3–4 meters at least, but the brightness decreases. Even at the acid extreme, the trail L' is still visible, and the solution (which is of course well buffered) shows, after dilution with water, a pH of approximately 5.3. When the fluid is moving in the pattern of a classical Von Karman vortex street, the luminous wake shows this pattern and can be seen to consist of fluid that has passed through the boundary layer immediately next to the anodal electrode 3 itself. Table A presents typical experimental results.

*Table A*

| Amount of acid added (1 N) (ml.) | Length of trails (cm.) |
|---|---|
| 1.3 | 1.5 (surface glow gone) |
| 4 | 3.5 |
| 6.6 | 10 |
| 8 | 15 |
| 10 | 21 |
| 12.5 | 28 } trail very bright |
| 14 | 30 |
| 15.5 | 56 |
| 17 | 91 |
| 18.5 | 140 } intensity diminishing |
| 22.4 | 245 |
| 26.3 | 300–400 |

The series of changes that occur with increasing acidity is quite reversible. If $N(CH_3)_4OH$ is added gradually to the acidified solution, the luminous trails L' become shorter until, finally, only the turbulent boundary layer at the electrode is again glowing. Table B presents some experimental observations.

*Table B*

| Amount of base added (1 N) (ml.) | Length of trails (cm.) |
|---|---|
| 0.33 | 15. |
| 1 | 10. |
| 2 | 6. |
| 4 | 4 (with slight glow at surface). |
| 5.25 | No trail; bright turbulent boundary layer crawling over electrode. |

The shortening and lengthening process can be repeated any number of times.

It should be evident that this method of visualizing flows past solid objects has particular advantages. The subsequent history of the fluid originating in the whole boundary layer or any part of it can be traced as far as desired by painting part of the electrode 3, without disturbing the flow in the boundary layer in any way. The electrode can be made in any shape and inclined at any angle to the stream. The current from the source 7 can be supplied to the electrode in pulses instead of continuously. The electrochemical reaction is sufficiently rapid so that pulse rates as high as several hundreds per second (or even several thousand per second under some conditions) will produce discrete bursts of luminous trail. In this way, the motion and the velocities in the wake can be measured for rapidly changing unsteady flow as easily as for steady flow.

The system can also be used with other organic solvents, particularly those that have kinematic viscosities widely different from water or methanol. Such solvents have Reynolds numbers (and therefore equivalent free-stream velocities) that are very different from that for water for the same actual system velocity. A decrease in the effective Reynolds number can be obtained easily. In a luminol-in-water system glycerol may be substituted for water in almost any ratio. Some solvents will cause a substantial change in the reverse direction. Thus, liquid sulfur dioxide would yield a Reynolds number 3.34 times larger than an aqueous solution moving at the same speed, and liquid ammonia would multiply the Reynolds number by 3.03. The system operates quite well at $-50°$ C. in methanol. Sulfur dioxide and ammonia would not be difficult to handle in a linear flow system, since they are both standard refrigerants. Liquid hydrogen cyanide also has a most favorable viscosity factor. Of the ordinary solvents, the most promising seem to be diethyl ether, which increases the Reynolds number by a factor of 2.7 over that for $H_2O$, and acetone, which increases the Reynolds number by a factor of 2.4. Others can be found, but the solvents mentioned also satisfy the indispensable condition of being fairly good ionizing solvents for some salts and therefore provide the necessary conductivity. For a given Reynolds number, these solvents allow a longer photographic exposure because of lower hydrofoil velocities.

In connection with lucigenin (N,N'-dimethyl-5,5'-bis-acridinium nitrate), before mentioned, the light intensity may be 100 times that of luminol, or more.

It should be noted that the different chemiluminescent compounds are not incompatible; they all require about the same pH and concentration of hydrogen peroxide to produce light. Only the vat dyes requires an organic ionizing solvent, such as pyridine, since they are insoluble in water; but the luminescence of luminol and lucigenin is also produceable in these media. They do not all produce light at the same voltage differences between the electrodes, however; so that it is possible to change the color by varying the voltage in a solution containing a mixture of such substances. The group of chemiluminescent vat dyes offers aspects of particular interest. These polycyclic quinones are also organic semi-conductors and photoconductors: the ones which exhibit chemiluminescence in solution seem to be singled out by an extraordinarily high conductivity as compared to similar compounds which do not. The energy difference between the lowest excited states and the ground state, moreover, as estimated by the long wave-length limit of their photoconductivity and in other ways, is not only especially low, but seems to correspond, at least roughly, to that of the chemiluminescent spectrum. Using this rather natural principle as a guide, it appears possible to extend the emission spectrum of electro-chemiluminescence substantially further into the red and infra-red, insofar as the absorption of the solvent permits.

Figure 2:
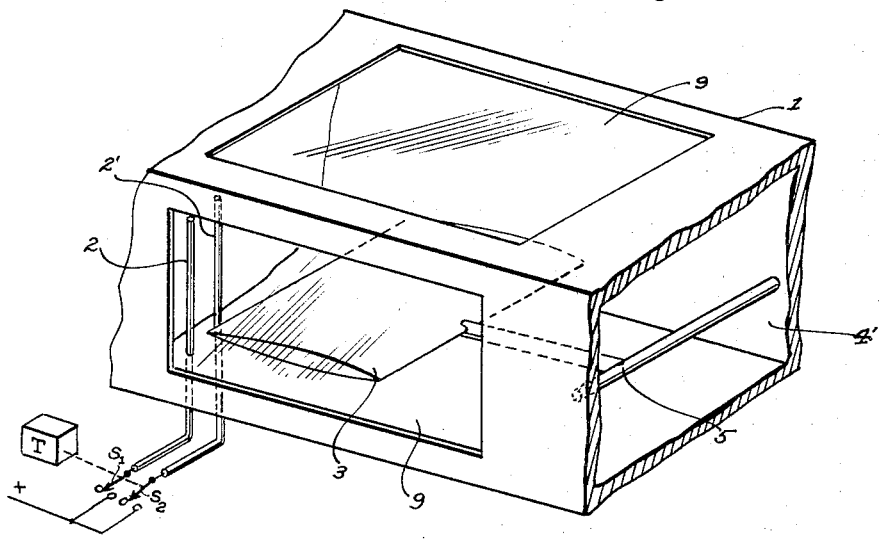
FIG. 2 is a similar view of the invention adapted for fluid-velocity profile observations by long-lived bursts of light, and/or for generation of visual timing markers.

Visual observation of the lines of fluid flow of such a nature as to provide a velocity profile of the flow around the hydrofoil or other member 3 may be obtained with the modification shown in FIG. 2. The hydrofoil 3 is there not connected as an anode, but a plurality of vertical wires, two of which are shown at 2, 2' may be employed as the anode, instead. It is to be understood, moreover, that the same cathode and other circuit and pump connections employed in the embodiment of FIG. 1 may be used in the system of FIG. 2, also, and that more than two wires 2, 2' may be used as an anode, as may horizontal or other grid wires, not shown, if desired. In order to provide flexibility for observation of the flow characteristics, the different wires 2, 2' may be alternately connected to the power supply +, as with the aid of the switches S1 and S2 that may connect the respective wires 2 and 2' to the source +. Separate profiles of the flow characteristics may thus be observed. With the switches S1 and S2 in the closed position, both of the wires 2 and 2' will be connected to the source +, giving a plurality of profiles simultaneously.

Voltage may also be applied in pulses as by opening and closing the switches S1 and S2, thereby providing only bursts of electro-chemiluminescent light emission. If these bursts are effected at predetermined timed intervals, as under the control of a timing mechanism T, such as a motor-driven contactor for opening and closing the switches S1 and S2, luminous timing markers will appear along the fluid flow enabling time calibration of the display. If desired, of course, well-known electronic or electrically pulsed circuits may equally well be used as fully equivalent to the switching mechanism S1, S2.

Figure 3:
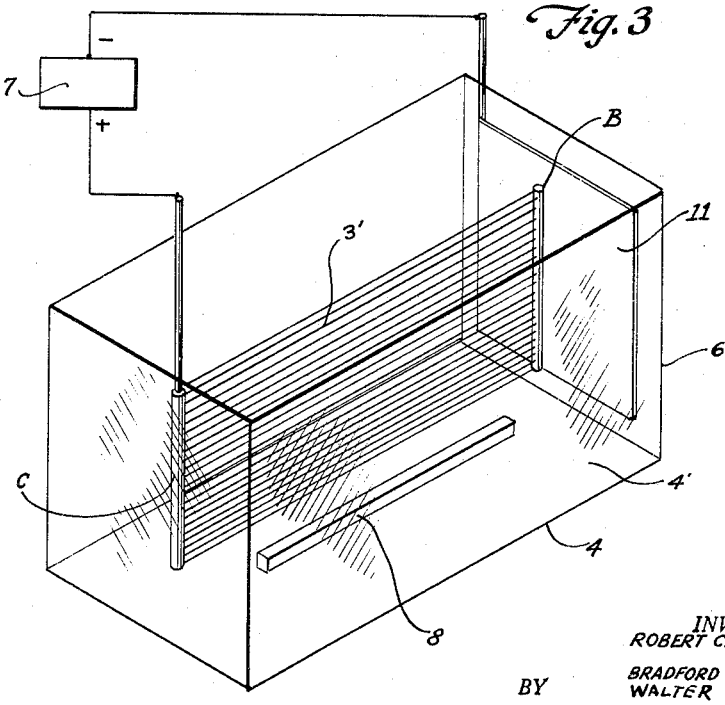

A further application possible as a result of the continual and confined bright electro-chemiluminescence afforded by the present invention, is that of a light source for optical instruments, including instrument calibration apparatus and communication systems. This utilization of the invention for these purposes may be effected in a number of different ways. One way is shown in FIG. 3 wherein a cell 4, containing the luminol or other desired fluid medium and reagents 4', is provided with at least a transparent front face 6 for viewing an internal anode electrode 3' constructed in the form of a plurality of fine parallel platinum wires or the like, horizontally extending between posts B and C. The electrode 3' is connected to the positive terminal of the power source 7, as in the circuit of FIG. 1, and the negative terminal of the source is connected to the nonglowing cathode 11, such as platinized platinum, properly placed against an end wall of the cell 4. Again, the source 7 may be a pulsed or modulated alternating current as well as a direct current. While, as later discussed, thin enough wires may generate sufficient heat to produce fluid circulation at their surface, a heater, vibrator or other pumping mechanism is schematically shown at 8 for the purpose of aiding such circulation of the fluid medium 4', as before mentioned, past the anode 3', in the vertical direction. The fluid should preferably not be circulated along the horizontal length of the thin anode wires 3' in order that there be sharply defined linear electro-chemiluminescent effects. The thin-wire cell will provide a fast-response high-intensity light emission. Solid-surface electrodes could also be used, though with different time response.

Another illustration of a light source is shown in FIG. 4, wherein the electrode wires 3' are this time connected by terminal strips 12, 12' to a radio-frequency generator 10 of pulsed or otherwise modulated raido-frequency energy, or a continuous wave energy, to heat the fine wires 3' in the fluid medium 4', and cause them to produce a chemiluminescent glow on their surfaces. By keeping the wires fine enough, as before explained, the generated heat will cause some circulation of the fluid as well as energy to excite the chemiluminescence and enable the production of substantially continuous bright chemiluminescence. This circulation however may again be aided by the member 8, as described in connection with embodiment of FIG. 3.

As still another illustration, in the system of FIG. 5, the member 3 is shown in the form of a plate 3′′′ that is subjected to strong elastic vibrations from an electric energy vibrator or driver 14 that substantially confines the vibrations to the surface of the plate 3′′′ and does not substantially vibrate the fluid medium 4′ contained within the cell 4. Since a kind of luminescent effect has been observed in appropriate fluid media upon the application of ultra-sound energy, if the cell 4 is sufficiently large and the driving power and amplitude of vibration are appropriately adjusted, chemiluminescence will be produced immediately in the vicinity of the surface of the plate 3′′′. Again, additional circulation for the insurance of appropriate fresh fluid at all times along the surfaces of the plate 3′′′ may be obtained with the aid of the before-described member 8.

In the embodiment of FIG. 6, another application of the invention is illustrated, this time, in the form of low-voltage, low-power-consumption, fast-pulse-response pilot or other lamp that constitutes an electro-chemiluminescent cell. The cylindrical cell 20 of FIG. 6 is provided with a transparent window 22 at one end, and contains an electrode 3′′ and a cathode electrode 11′, respectively to be connected to the positive and negative terminals of any desired voltage source. If desired, the cathode 11 may be in the form of a conductive coating on the inside of the tube 20 or it may be a separate electrode, as shown. The anode electrode 3′′ may be a thin wire having a terminal plate or loop member 3′′. Both of the electrodes may be platinum, and an auxiliary circulation-insuring vibrator or heating member 24, may be employed to keep the electro-chemiluminescent fluid moving past the surface of the anode 3′′ at which the luminescent glow is produced. Such a low-voltage, low-power-consumption indicator is inexpensive to manufacture and maintain, and is particularly adapted for use in multiple arrays. In addition, the anode 3′′ may be formed into any desired shape for producing any letter, number of any other configuration as desired.

Figure 7:
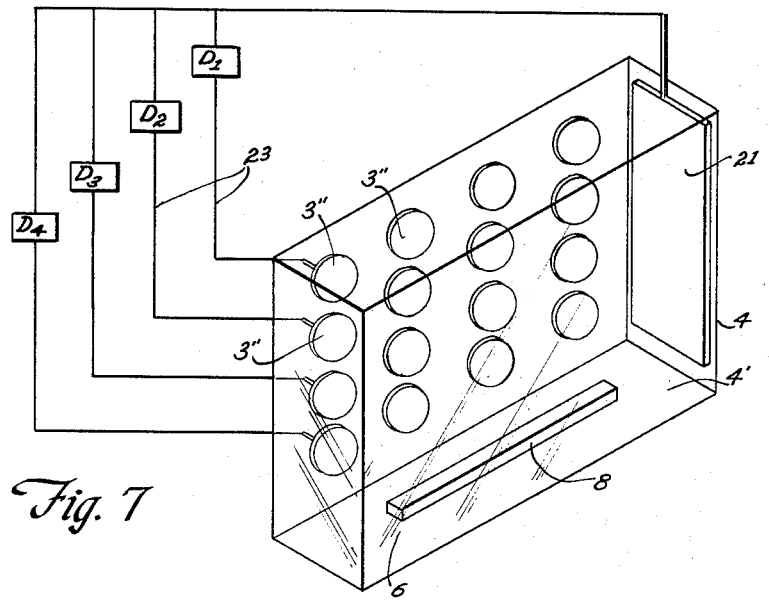
FIG. 7 is a further modification employing a plurality or array of electro-chemiluminescent lamps.

In the system of FIG. 7, a modified electro-chemiluminescent multi-lamp array is shown. These lamps could be of the particular construction shown in FIG. 6, but in order further to demonstrate the extreme versatility of the present invention, they are shown somewhat differently constructed in FIG. 7, in the form of a plurality of the platinum anode discs 3′′ disposed in a two-dimensional array. Each disc is connected through a respective conductor 23 to batteries or other power sources, illustrated at D1, D2, D3, D4, etc., and thence, preferably, to a common platinum or other cathode 21 disposed within the cell 4 containing the electro-chemiluminescent fluid 4′. Once more, a heater, vibrator or pumping mechanism 8 is shown employed for insuring the circulation before referred to. A cell of this type, moreover, has extreme reliability of operation.

Figure 8:
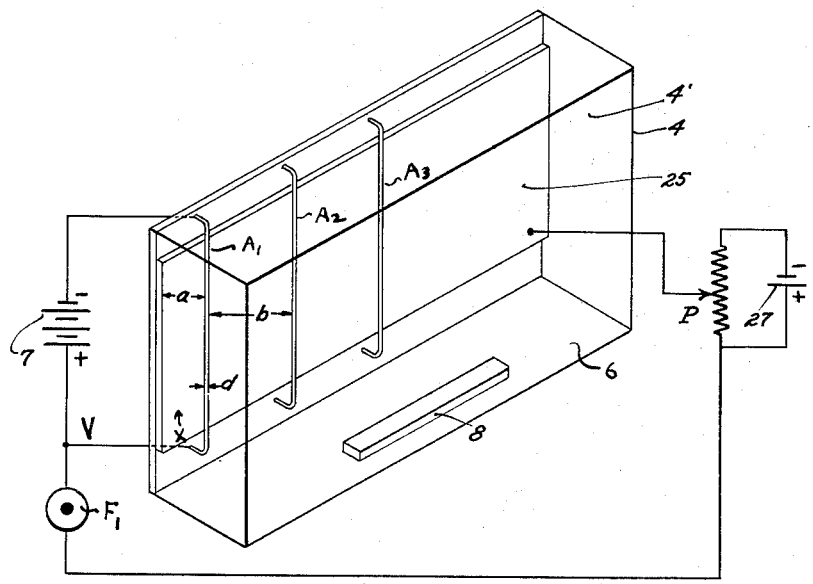
FIG. 8 illustrates the use of the invention in connection with the display of voltage or current magnitudes as lighted areas of long-wire electrodes, where the length of the lighted area has a linear, logarithmic, or other functional relation to the magnitude of the control voltage or current, as for generating light bar-graphs as an output display for electronic equipment.

Still a further application of the present invention as a light source is shown in the bar-graph display system of FIG. 8. This apparatus is based upon the following discovery. If a wire of high resistance, such as 1-mil platinum or the like, is provided with a potential +V at one end, with the other grounded, and is immersed with a second electrode of constant potential in a luminol solution prepared as before described, then, as the voltage V is varied, the potential at all points of the wire will vary monotonically, and the distance X from the lower end at which a critical potential $h$ is first obtained, will move up and down the wire. The potential $h$ may be the threshold voltage that divides those voltages that are large enough to produce a visible electro-chemiluminescent glow from those that produce none. For a given V, the wire will be lightend from the point X to the top, and will be dark below. As V increases and decreases, the lighted segment will lengthen and shorten correspondingly.

In the embodiment of FIG. 8 a plurality of substantially equally spaced parallel wires A1, A2, A3, etc. is shown, arranged in a fashion similar to the vertical lines on a sheet of graph paper. Adjustment of a potentiometer P, connected to a bias source 27, will enable the threshold voltage for luminescence to be established between the wire electrodes A1, A2 and A3 and a common non-glowing cathode electrode 25, as of the before-described platinized platinum. One will observe different degrees of glow along different lengths of the various electrodes A1, A2 and A3 depending upon the individual adjustments of the potentiometers P associated with the additional voltage sources of each of the electrodes thereby to provide any bar-graph display that might be desired. In the case of a system 6 using luminol for the chemiluminescent reagent, it is desirable to use sodium acetate instead of potassium chloride therein since the latter tends to bubble and produce hypochlorite in the over-voltage region which would diffuse through the solution and cause bulk glow. The source 7 will set up a direct current voltage gradient along the high-resistance wire A1, as will the other similar sources, not shown, individually associated with the other electrodes A2, A3, etc. F1 is a current source associated with the wire A1, connected between the lower terminal thereof and the potentiometer P, wherein the current produced thereby is proportional to the variable that is to be displayed by the glow on the electrode A1. Similar current sources, not shown, will be similarly associated with the other electrodes. When current is supplied by F1, that part of the wire A1 that is above the threshold potential will light up, producing a bar display, as before discussed.

In order to prevent interaction between the electrodes A1, A2 and A3, the following relationships should be satisfied. The separation $b$ between the individual wires A1 and A2 and A3, etc., should be very much larger than the cross-section $d$, of the wires. That cross-section $d$, in turn, should preferably be very much less than the distance $a$ between the cathode 25 and the wires A1, A2 and A3.

Still further embodiments of the present invention are illustrated in FIGS. 9 and 10 in connection with light amplifier panels and image converter panels and the like. If fluid and receptors are chosen so that the wavelengths of the input radiation and output radiation are the same, and a small amount of input intensity change produces a larger amount of output intensity change, the panels may act as light amplifiers. If the fluid and receptors are chosen so that input radiation is in one wavelength band, and the output is in a different wavelength band, the panels will be image converters. In the system of FIG. 9, a plurality of conductive regions, such as platinum spots 30, are formed upon a photo-conductive layer 32, such as a cadmium sulphide sheet, which, in turn, is connected to a light-transparent or other radiation-transparent incident-energy electrode surface 34. The surface 34 is connected to the positive terminal + of a voltage source 7, the negative terminal − of which is connected to a light-transparent conductive screen or grid 6′, permitting visual observation of the metal regions 30 from the front of the cell 4 containing chemiluminescent fluid medium 4′. Again a heater or vibrator or other circulator member 8 may be employed. Insulating material 31 is disposed between the platinum regions 30 in order to insulate otherwise exposed portions of the photo-conductive layer 32 from the fluid medium 4′. This may be effected by causing the insulator 31 to seal to the edges of the platinum members 30 to the intermediate portions of the photo-conductive layer 32. The platinum members 30 will glow when the voltage between them and the conductive transparent screen 6′ reaches the before-mentioned threshold value. The photo-conductive material is thus employed as a variable resistance receptor, whose resistance decreases with increasing intensity of the input energy, and operation for light amplification or image conversion may be effected as above described.

By using separate photo-diodes C1, C2, C3, C4 or other devices with photo-electric properties as receptors connected with each of the platinum light-emitting members, shown at 41, 42, 43, 44, etc. in FIG. 10, similar light amplification or image conversion may be attained. Each of the platinum members 41, 42, 43, 44, etc., is electrically connected by corresponding conductors 51, 52, 53, 54, etc. to the respective photo-diodes C1, C2, C3, C4, etc., upon which incident light or other energy impinges. The other terminals of the photo-diodes are connected through the battery source 7 to the light transparent conductive screen 6' disposed within the chemiluminescent fluid medium 4' behind the transparent window 6 of the housing 4. As light strikes the photo-diodes and generates a current, the appropriately biased platinum members 41, 42, 43, 44, etc. will glow if they are rendered sufficiently anodic in the chemiluminescent solution of the cell 4. Such a device provides a relatively fast response time constant of the order of $10^{-4}$ seconds, instead of the relatively slow time constant of the order of one-tenth of a second for the photo-conductive system of FIG. 9.

Another application of the present invention is shown in the embodiment of FIG. 11, in which a matrix of conductors is provided within the circulated chemiluminescent medium 4', labelled 0, +1, and 0 in the vertical direction, and +1, 0 and +1 in the horizontal direction. In actual practice, a much larger array of conductors may be employed. Near the intersecting regions of the vertical and horizontal matrix elements, the elements are provided with pairs of electrodes, one member of each pair being of the glowing type, as of platinum, shown at 60, 62, 64, on the vertical conductor 0; at 60', 62' and 64' on the +1 conductor; and at 60'', 62'' and 64'' on the rightmost conductor 0. Non-glowing electrodes, as of platinized platinum or the like, are connected to the horizontal conductors, as shown at 70, 70' and 70'' in connection with the horizontal upper conductor +1; at 72, 72' and 72'' for the middle horizontal 0 conductor; and at 74, 74' and 74'' for the lower-most horizontal conductor +1. The electrodes 60, 60' etc. are preferably disposed at an angle to the electrodes 70, 70' etc., as shown, to permit the glow upon the first-named electrodes to be readily apparent. Except at the electrodes, the conductors will be insulated. No threshold effect is needed with the system thus disposed within a luminol or other appropriate electro-chemiluminescent medium 4' since the glow will only occur at the matrix-conductor intersections at which there will be established the necessary voltage of the correct polarity between the members of the pairs of electrodes. Therefore, as the voltages on the conductors of both the vertical and horizontal arrays are changed only the electrodes at the regions where sufficient potential difference exists will produce illumination. Thus the voltage states necessary to drive the system on or off, are 0 and +1 in this two-voltage state device. In the illustrated embodiment, the region of the electrode 62', in the center, will be the only intersection region having the necessary +1 voltage for producing electro-chemiluminescene. Such a matrix may, of course, be used as part of many of the host of current computer read out, display and memory systems; and, in view of the low voltages required, is ideally suited for use with electronic circuits and the like employing low voltage elements such as transistors. This same assembly can be used to produce multi-color matrix displays by using a mixture of electro-chemiluminescent substances of different colors and with different voltage thresholds for light emission. Any electrode pair for which the glowing electrode 62' is at a positive potential with respect to its non-glowing electrode 72' might emit blue light when this potential is 1 volt, green light when this potential is increased to 2 volts, etc.

A three voltage-state matrix of character similar to that in FIG. 11 is shown in FIG. 12. Driving voltages of 0, +1 and −1 are used and a glow will be produced only when the net potential difference between the plates of an electrode pair, 62' and 72' for example, is two volts. The solution 4' is prepared so that the turn-on threshold for light is greater than one volt and less than two volts. The vertical insulated conductors are provided with the same illustrative voltage states, as in FIG. 11, but the horizontal conductors are shown provided with an upper conductor of state 0, a center conductor of state −1 and a bottom conductor of state 0. Both electrodes of each pair; i.e., 62' and 72' for example, are made of platinum or other suitable electrode material, and that plate which is anodic will glow if the solution 4' uses luminol. Multicolor displays may be constructed with a mixture of chemiluminescent reagents in the solution 4' and varying the driving voltages as in FIG. 11. In addition a luminiescent chemical, used in solution 4', which will exhibit both anode and cathode glow, of different color, for instance lucigenin, will allow a two-color display merely by selecting which plate of each electrode pair is tipped such that it can be seen from the front of the matrix.

The system of FIG. 13 shows another display panel configuration, in this case one that will generate a full color image from triples of primary colors. The panel consists of clusters of three electro-chemiluminescent cells of the type shown in FIG. 6 arranged in a regular array. Each cell contains its own glowing anode electrode and non-glowing cathode electrode. A glow in a particular cell is produced by applying a potential of the correct voltage and polarity between the two buss wires that connect to it. Each cluster of three cells consists, for instance, of one filled with a red electro-chemiluminescent reagent, one filled with a green electro-chemiluminescent reagent, and one filled with a blue electro-chemiluminescent reagent. Alternatively the cells may all be similar, but may be provided with filters or the like for achieving multi-color results.

Similarly, in the system of FIG. 14, large transparent different-color-producing or differently filtered cells of the character shown, for example, in FIGS. 11 or 12, may be employed in interlaced or sandwiched arrangements, as labelled "red," "blue" and "green," again to produce illumination in response to signal control of the very efficient and convenient electro-chemiluminescent matrices or arrays. In addition to using chemiluminescent materials in the cells that, as before explained, have been found to produce different-color glows, some fluid substances have been found to glow in somewhat different colors depending upon the different control voltage applied thereto. Besides "luminol" and "lucigenin" and their derivatives, which exhibit luminescence only in the blue and green, before discussed, another class is known in which the chemiluminescence has a wider range of color. This consists of certain polycyclic quinones, commonly used as "vat dyes" for cotton. Dibenzanthrone (violanthrone) luminescenes bright red when $Cl_2$ is passed into a solution of the dye in $CHCl_3$ or pyridine, and $H_2O_2$ is added. Some related compounds produce yellow and orange light. By using pyridine as a solvent, adding a soluble conducting salt and $H_2O_2$, a luminescence of the same color can be obtained at the anode, in the absence of $Cl_2$.

When one considers what probably determines the presence and color of electro-chemiluminescence in a compound, attention is directed to the abnormally low or narrow energy gap for electronic or optical excitation from the normal or "ground state." This energy-gap may be estimated theoretically, or measured from the temperature-coefficient of resistance in the solid substance, the long-wave-length limit of light which produces conductivity, even from the absorption spectrum of the solid. In all cases, the luminescent dyes are singled out from others by having abnormally low values for the excitation energy (making its attainment possible by chemical and electrode reactions); and the color of the emitted radiation is consistent with the assumption that it is produced by spontaneous passage of the molecules back into their original condition. From this, one can predict which additional substances, such as cyananthrone and siloxene, show electro-chemiluminescence, and which of them emits at various wave-lengths in the visible or infra-red spectrum. While the invention has been described in connection with liquid or gel forms of fluid electro-chemiluminescent media, certain substances that exhibit the chemiluminescent effect in liquid form can also exhibit a photoconductive effect, when in the solid state, that therefore enables their use directly in electrical circuits.

The versatility of the invention is further illustrated in FIG. 15, as applied to a trajectory tracing apparatus wherein an anode A is disposed within a chemiluminescent gel or fluid 4' contained in a transparent cell 4, the bottom wall 71 of which may be employed as a cathode. The movement of the anode 4 by an insulating rod R, as is easily accomplished by servo mechanisms or the like, schematically represented by the X, Y and Z coordinates, according to some computer or other control system, will cause glowing point A to trace a trajectory of some object of interest. The medium 4' will preferably be a gel of luminol or the like with a long life-time luminescent trail formula of the type before described. The trajectory will then be indicated as a stream of light, as described in connection with the embodiments of FIGS. 1 and 2. Other electrodes A may similarly be so moved to provide multiple-trajectory plotting.

Figure 16:
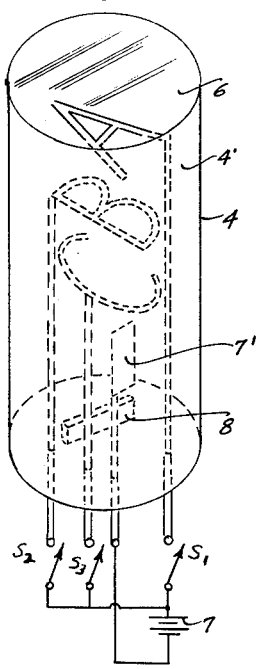
FIGS. 16 and 17 are perspective views of character-number generators made by forming the characters stacked in a single tube and lighting the appropriate figure by activating the correct electrode or electrodes.

In the embodiment of FIG. 16, another widely different application of the invention is illustrated wherein platinum or other suitable wire anodes are shown in the form of letters or characters A, B and C, respectively connected by switches S1, S2 and S3 to the positive terminal of the source 7, with a common cathode 7' disposed within the cell 4, having a transparent end window 6 and containing the electro-chemiluminescent medium 4'. When viewing the window 6, therefore, one will see only the particular letter that is luminescing. Again, circulation may be provided by a heater or other mechanism 8, as before described. Clearly the invention may also be used for general lighting or advertising sources as well.

Figure 17:
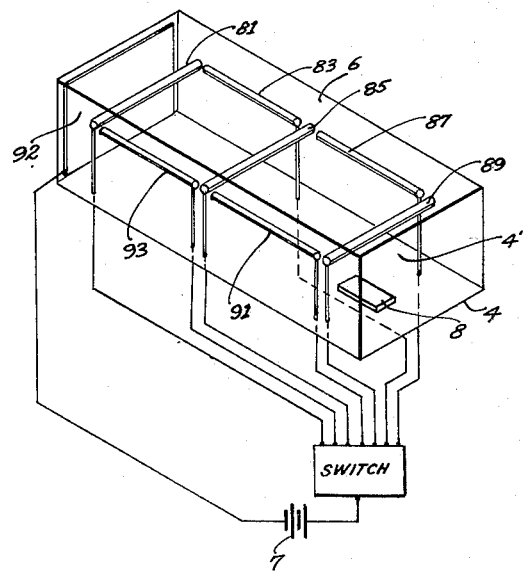

Another embodiment of a character display tube for forming a character without the necessity for preformed electrodes, is shown in FIG. 17. Differently oriented platinum bars or other strip anodes are illustrated at 81, 83, 85, 87, 89, 91, and 93, the lighting of individual combinations of which will form any desired character, such as letters or numbers. Operation of the individual switching mechanisms, labelled "Switch," connect appropriate anodes to the source to form the desired characters to be displayed. The anodes are contained within the chemiluminescent medium 4', and are viewed through a display window 6. The internal cathode 92 is shown disposed against the left-hand end wall of the cell 4.

Figure 18:
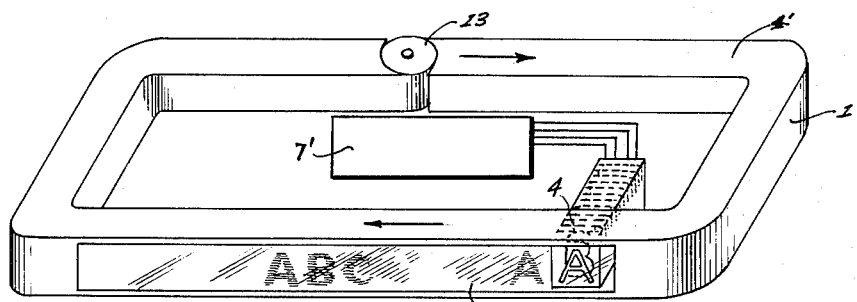
FIG. 18 is a similar view of apparatus for generating a sequence of characters deposited in the solution as a long-lasting figure in light.

In the modification of FIG. 18, a system somewhat similar to that shown in FIG. 1 is provided. The housing 1 containing the chemiluminescent fluid 4', however, is provided with a front window 9' of considerable extent. A cell member 4, of the type described in connection with the embodiments of, for example FIGS. 16 or 17, is shown at 4, connected with the necessary circuit 7', before described, for indicating the particular character or display that is to be effected. The pumping mechanism 13 causes a chemiluminescent glowing trail to be produced, thus to enable there to be generated, traveling along the window 9', a visible display of successive letters, characters or other information. Through the utilization of a long-life trail fluid mixture with high viscosity, as previously discussed, the turning on of individual characters at the cell 4 for short times, will provide a sequence of glowing characters that drift down stream in the fluid. One could, of course, also, maintain a relatively stationary fluid (sufficiently circulated for the purpose of providing the bright continual intensity before described) and move the character-producing tube along the fluid if desired.

Figure 19:
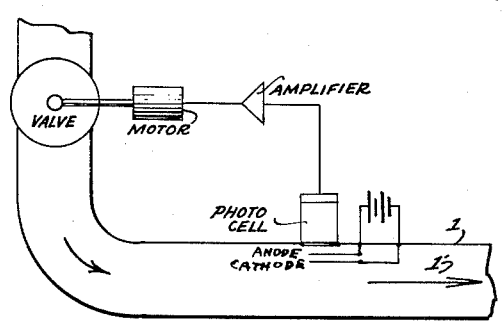
FIG. 19 is a view of still another modification of a fluid-flow system, to which an electro-chemiluminescent solution may be added without complication, and controlled by a feedback system for monitoring turbulence or brightness at an electrode.

In the embodiment of FIG. 19, as still another application of the invention, the turbulence in fluid flow is monitored in a channel 1. Chemiluminescent materials are injected into the fluid upstream, and anode and cathode electrodes, so labelled, are disposed within the fluid, at a predetermined location. The electrochemiluminescent glow produced at the anode will be picked up by a photocell, monitoring that location. The photo-cell signal may be amplified in an amplifier, so labelled, and may be used to drive a control motor for operating a valve that, in turn, controls the fluid flow in accordance with the degree of turbulence that exists in the housing 1. The electrode geometry is selected so that turbulence sets in over the anode surface at a desired fluid flow rate. By measuring the brightness of the glow at the anode, as received by the photo-cell, and feeding back this signal to adjust the valve and thereby to minimize brightness to the desired value, one can insure that the fluid flow has the necessary characteristic and that undesired turbulence has been prevented.

As before explained, numerous types of preferably passive electrode materials may be employed in the various types of electro-chemiluminescent media and devices, including, in addition to platinum, such materials as stainless steel, nickel, graphite and the like, and these materials may be used directly or as electro-plated finishes on other metals or as conductive or semi-conductive films deposited on insulators.

Further modifications will occur to all those skilled in the art and all such are considered to fall within the spirit and scope of the invention as defined in the appended claims.

What is claimed is:

1. A process for producing the luminescent emission of radiant energy, that comprises, disposing a predetermined surface within a medium containing chemiluminescent molecules of the type that illuminate when oxidized or reduced, supplying electric energy to the said surface of value sufficient to cause oxidation or reduction of a plurality of the chemiluminescent molecules in the medium, thereby to cause electro-chemiluminescence of such molecules, and effecting circulation of the medium past the said surface.

2. A process as claimed in claim 1 and in which the supplied energy is adjusted to a value sufficient substantially directly to effect the said chemiluminescence.

3. A process as claimed in claim 1 and in which the supplied energy produces a chemical catalyst in the medium that effects the said oxidation or reduction.

4. A process for producing the luminescent emission of radiant energy, that comprises, disposing a predetermined electrically conductive surface together with an electrode within a medium containing chemiluminescent molecules of the type that illuminate when oxidized or reduced, supplying electric energy between the said surface and the electrode of value sufficient to cause oxidation or reduction of a plurality of the chemiluminescent molecules in the medium, thereby to cause electro-chemiluminescence of such molecules, and effecting relative movement of the medium and the said surface.

5. A process for producing the luminescent emission of radiant energy, that comprises, disposing within a medium containing chemiluminescent molecules, of the type that illuminate when oxidized or reduced, a predetermined surface and a plurality of electrodes means at least one of which is near the said surface, and supplying electric energy to the electrode means of value sufficient to cause oxidation or reduction of a plurality of the chemiluminescent molecules in the medium near the said surface, thereby to cause electro-chemiluminescence of such molecules.

6. A process as claimed in claim 5 and in which the medium is caused to move over the said surface.

7. A process for producing the luminescent emission of radiant energy, that comprises, disposing a plurality of predetermined surfaces within a medium containing chemiluminescent molecules of the type that illuminate when oxidized or reduced, supplying energy to the said surfaces of value sufficient to cause oxidation or reduction of a plurality of the chemiluminescent molecules in the medium, thereby to cause chemiluminescence of such molecules, and effecting circulation of the medium past the said surfaces.

8. A process as claimed in claim 7 and in which a plurality of currents are applied to the plurality of surfaces to produce separate electro-chemiluminescent effects therealong.

9. A process as claimed in claim 1 and in which the said medium is selected from the group consisting of luminol, lucigenin, and polycyclic vat dyestuffs.

10. A process as claimed in claim 1 and in which the pH of the medium is varied to vary the luminescent effects.

11. Luminescent apparatus having, in combination, a cell containing a chemiluminescent medium, a conductive surface disposed within the medium, means for applying electric energy to the surface of value sufficient to effect electro-chemiluminescence, and means for effecting circulation of the medium past the said surface.

12. Luminescent apparatus having, in combination, a cell containing a chemiluminescent medium, a surface disposed within the medium, a pair of electrodes disposed within the medium with at least one of the electrodes near the said surface, and means for applying electric energy to the electrodes of value sufficient to effect chemiluminescence, and means for effecting circulation of the medium past the said surface.

13. Luminescent apparatus as claimed in claim 12 and in which means is provided for pulsing the application of the energy to the electrodes.

14. Luminescent apparatus having, in combination, a cell having a light-transparent wall and containing a chemiluminescent medium, an electrode surface disposed within the medium together with a further electrode, means for applying electric energy between the electrode surface and the further electrode of value sufficient to effect electro-chemiluminescence, and means for effecting circulation of the medium past the said surface.

15. Luminescent apparatus having, in combination, a cell having a light-transparent wall containing a chemiluminescent medium, a plurality of conductive electrode surfaces disposed within the medium, and means for applying electric energy to the surfaces of values sufficient to effect electro-chemiluminescence.

16. Luminescent apparatus as claimed in claim 15 and in which a further electrode is provided in the medium between which and the plurality of electrode surfaces the said electric energy is supplied, the further electrode being disposed at a position within the cell where its surface is not readily visible through the light-transparent wall.

17. Luminescent apparatus having, in combination, a cell having a light-transparent wall and containing a chemiluminescent medium, a plurality of electrodes disposed with further electrode means within the medium, means for applying electric energy between the plurality of electrodes and the further electrode means of threshold value effecting chemiluminescence, and means supplying a plurality of additional currents to the plurality of electrodes to indicate separate chemiluminescent effects therealong.

18. Luminescent apparatus having, in combination, a cell having a light-transparent window and containing a chemiluminescent medium, a plurality of electrode surfaces disposed within the medium and juxtaposed to photosensitive means upon which radiation may impinge, and means for applying electric energy to the electrode surfaces and across the photosensitive means of value sufficient to effect chemiluminescence in accordance with the radiation impinging on the corresponding portions of the photosensitive means.

19. Luminescent apparatus as claimed in claim 18 and in which the chemiluminescence is of substantially the same wavelength as the said impinging radiation.

20. Luminescent apparatus as claimed in claim 18 and in which the chemiluminescence is of different wavelength from that of the impinging radiation.

21. Luminescent apparatus as claimed in claim 18 and in which the photosensitive means comprises a photosensitive surface upon which the plurality of electrode surfaces is mounted and with means for insulating the portions of the photosensitive surface between the plurality of electrode surfaces from the medium.

22. Luminescent apparatus as claimed in claim 18 and in which the photosensitive means comprises a plurality of separate photosensitive devices, one connected to each of the plurality of electrode surfaces.

23. Luminescent apparatus as claimed in claim 14 and in which the said electrode surface is pre-formed into a predetermined intelligible character.

24. Luminescent apparatus as claimed in claim 15 and in which each of the plurality of electrode surfaces is pre-formed into differently oriented conductive segments, and switching means is provided for connecting the electric energy to different predetermined groups of segments to form different intelligible characters at which chemiluminescence is produced.

25. Luminescent apparatus as claimed in claim 14 and in which means is provided for moving the chemiluminescent effect once produced along the medium in order to produce a traveling display.

26. Luminescent apparatus as claimed in claim 14 and in which means is provided for monitoring and producing a signal corresponding to the glow of the chemiluminescence, and feedback means is provided responsive to the signal for controlling the said circulation in accordance with the signal, thereby to produce a desired circulation effect.

27. Luminescent apparatus as claimed in claim 14 and in which the medium is selected from the group consisting of luminol, lucigenen, polycyclic vat dyestuffs, cyananthrone and siloxene.

28. Luminescent apparatus as claimed in claim 14 and in which the said electrode surface is selected from the group consisting of platinum, stainless steel, nickel and graphite.

29. Luminescent apparatus as claimed in claim 14 and in which the further electrode is of platinized platinum.

References Cited by the Examiner
UNITED STATES PATENTS

| | | | |
|---|---|---|---|
| 988,104 | 3/11 | Jenckes | 313—358 |
| 2,420,286 | 5/47 | Lacey et al. | 252—301.3 |
| 2,487,753 | 11/49 | Cohn | 67—19 X |
| 2,977,320 | 3/61 | Jenkins | 252—301.3 |
| 2,984,744 | 5/61 | Lynch et al. | 250—71 |
| 3,015,747 | 1/62 | Rosenberg | 313—108.1 |
| 3,096,516 | 7/63 | Pendleton et al. | 340—166 |
| 3,100,844 | 8/63 | Vogel | 250—71 |

NEIL C. READ, *Primary Examiner.*

GEORGE WESTBY, *Examiner.*